United States Patent [19]
de los Reyes et al.

[11] Patent Number: 5,762,789
[45] Date of Patent: Jun. 9, 1998

[54] DISPOSABLE MEMBRANE MODULE WITH LOW-DEAD VOLUME

[75] Inventors: Gastón de los Reyes, Boston; J. Karl Niermeyer, Tyngsboro, both of Mass.

[73] Assignee: Millipore Corporation, Bedford, Mass.

[21] Appl. No.: 674,599

[22] Filed: Jun. 28, 1996

[51] Int. Cl.$^6$ ................................ B01D 63/00
[52] U.S. Cl. ........................... 210/321.75; 210/321.84; 210/321.8; 210/440; 210/443; 210/446; 210/288
[58] Field of Search ............... 210/321.75, 321.84, 210/500.23, 321.86, 321.8, 321.87, 321.88, 321.89, 440, 441, 443, 446, 288

[56] References Cited

U.S. PATENT DOCUMENTS

| | | | |
|---|---|---|---|
| 4,654,142 | 3/1987 | Thomsen et al. | 210/440 |
| 4,698,154 | 10/1987 | Mohn et al. | 210/321.75 |
| 5,041,220 | 8/1991 | Lee et al. | 210/321.8 |
| 5,069,780 | 12/1991 | Thalmann et al. | 210/257.2 |
| 5,133,858 | 7/1992 | Walz et al. | 210/321.8 |
| 5,139,668 | 8/1992 | Dan et l. | 210/321.8 |
| 5,180,490 | 1/1993 | Eihusen et al. | 210/440 |
| 5,221,473 | 6/1993 | Burrows | 210/257.2 |
| 5,389,260 | 2/1995 | Hemd et al. | 210/652 |
| 5,462,675 | 10/1995 | Hopkins et al. | 210/440 |

*Primary Examiner*—Ana Fortuna
*Attorney, Agent, or Firm*—John Dana Hubbard; Timothy J. King

[57] ABSTRACT

A membrane filtration module is disclosed for use in fluid processing systems in which all active connections between the module and the fluid processing system are located only on one end of the module. A central flow conduit within the module directs all of the flow of liquid from one of the connections to the opposite end. In this manner, dead volume is essentially eliminated as the flow pattern causes the liquid to sweep all the volume within the module while still providing for easy installation and replacement by virtue of having all of the active connections on only one end.

19 Claims, 9 Drawing Sheets

DISPOSABLE MEMBRANE MODULE WITH LOW-DEAD VOLUME

BACKGROUND OF THE INVENTION

This invention relates to membrane filtration. More specifically, this invention relates to membrane filtration modules that are cleaner and easier to use than those conventionally used in the filtration of ultrapure fluids, and more specifically, for those fluids used in semiconductor fabrication processes. Furthermore, this invention also relates to the design of membrane filter modules that are easy and convenient to replace by virtue of having all of their active ports on one end of the filter module. Hereafter, the terms filter, filter module and module will be used interchangeably.

The control of particulate contaminants in semiconductor fabrication processes requires the use of ultraclean filters having membranes that remove sub-micron particles (i.e. membrane filters). It is well known that any particle that is deposited on a semiconductor wafer produces a defect if the particle is large enough. Typically in the semiconductor industry killer defects can be produced by particles which are as small as one-tenth of the smallest feature size of the semiconductor chip. Therefore, membrane filters are used in every step of the process for making semiconductor chips to purify both liquids and gases. To meet these stringent requirements, membrane filters should have various desirable features as described below.

In addition to being free of particulate contamination, the volume of fluid contained within the module must not be stagnant or "dead". That is, the configuration of the volume within the module must be such that, as liquid flows through the module the entire liquid volume is exchanged, or swept, very rapidly. This is necessary for the fast and reliable clearance of any contaminants that may have inevitably entered the filter during manufacture as well as contaminants which may be generated during use. Membrane filters that meet this requirement will hereafter be referred to as "zero dead volume" filters.

Additionally, it is highly desirable to prevent or minimize the dripping of chemicals from the filter onto the process equipment during filter replacement. As a general practice it is always desirable to avoid such dripping, but in the case of clean room environments or hazardous chemicals this feature is essential. This can be accomplished by using a disposable (self contained) filter module in which all the active connections (i.e. those connections which are used while fluid is being filtered) are located on the top of the module. Another benefit of such a configuration is the ease of connection to the process equipment, which is significantly improved by having all the connections only on one end. Modules designed in this manner also tend to be more compact, which is an important consideration in high-cost environments.

Although many different designs have been developed for filters used in ultra-pure liquid filtration, two designs dominate the bulk of the filter modules used. In one filter design, which addresses the dead volume problem, the liquid to be filtered flows from one end of the filter module to the other. In this class of filters, the feed and permeate connections are located at opposite ends of the filter, thereby forcing the liquid flow to go from one end to the other. In this manner all the dead volume can be eliminated or at the very least minimized. This flow configuration is referred to as an "in line" flow configuration. Many disposable modules used today are designed in this manner. However, in spite of the zero-dead-volume advantage offered by the in-line configuration, these filters suffer from two disadvantages, first they are more difficult to connect to the process equipment since the module is "sandwiched" between two sets of connections, and secondly, any free liquid left within the module quickly drains upon disconnection due to the fact that at least one connection is at the bottom of the module.

To make installation to the process equipment simpler, and filter replacement easier, a second filter module design locates all of the connections on the same end of the module. In this type of module, the feed and permeate ports are typically horizontally oriented at the top or "head" end of the module, on opposite sides thereof. Due to their shape, these modules are referred to as having a "T" configuration. While the T configuration makes connection to the rest of the fluid system easier, it suffers from one primary disadvantage, namely that a dead space exists in the region between the bottom of the filter element and the module housing. As a result of this dead space, the time required to flush the module is very long, and may subsequently lead to the generation of unwanted contaminants in the case of fluids that deteriorate over time. In other words this region is a significant dead-volume and thus produces a non-clean condition.

Thomsen et al. in U.S. Pat. No. 4,654,142 describe a filtering system for water treatment which discloses the use of a separate and reusable head member with connecting ports that sealingly mate to connecting feed and collection ports on a disposable water purification cartridge. Both connecting ports are located on the same end of the disposable cartridge and are adjacent to each other. In one embodiment, carbon and ion-exchange resin cartridges used as adsorptive separation media are shown with a center conduit that redirects the flow from one of the ports to the opposite end of the cartridge or vice-versa. Although Thomsen et al. do not discuss the reason for using the center conduit, it is apparent to those skilled in the art that the conduit prevents by-pass of the water as it flows through the adsorptive resin media. While some of the embodiments disclosed by Thomsen et al. address the problem of flow by-pass in adsorptive resin bed cartridges, these designs still suffer from having low-flow regions far from the feed and collection ports. Furthermore, while these designs may be effective in reducing the flow by-pass problem in a resin bed cartridge, Thomsen et al., do not address the needs of membrane filter modules used in ultra-pure liquid filtration with respect to the issue of zero dead volume.

Accordingly, the need exists for membrane filters that are cleaner and easier to replace due to the fact of having connections on the same end of the filter, thereby avoiding the draining out of the liquid left within the module during replacement which leads to undesirable spills. Additionally, there is a need for membrane filters with the attributes discussed above with the further requirement of providing essentially zero dead volume.

SUMMARY OF THE INVENTION

The present invention overcomes the disadvantages and limitations of the prior art by providing a membrane filter module that combines the benefits of an in-line and a T filter configuration. This combined benefit is obtained by internally redirecting the flow in a T configuration filter through the use of a central flow conduit that directs the flow of one of the ports on the "head" of a T-line module to its opposite end. While the preferred configuration is that in which the head is on the top of the module, it should be understood that it may also be located in the down or bottom position without departing from the essence of this invention. Hereafter, the terms "up" and "head" will be used interchangeably to designate the end of the module which contains the connecting ports, and "down" and "bottom" will be used to designate the opposite end.

In a preferred embodiment, incoming feed liquid enters a feed port which is connected to a central conduit which directs all of the flow from the feed port to the other end of the module where it collects in a chamber and is distributed within the module and flows through a set of flow passages through a membrane. The filtered liquid is then collected at the outlet port and distributed to other portions of the fluid processing system. In this manner the entire volume of liquid to be filtered is swept through the module.

It is thus an object of the present invention to describe a filter module that has very low dead volume, is easy to replace and produces little or no spills upon replacement. It is also an object of this invention to describe a filter module that has the combined benefits of the in-line and the T filter configuration.

DESCRIPTION OF THE DRAWINGS

FIG. 6 shows an expanded cross-sectional view of the hollow fiber membrane separation element of FIG. 1a indicating the presence of flow passages formed by the hollow fiber lumen and by the space between the hollow fibers.

DETAILED DESCRIPTION OF THE INVENTION

Figure 1A:
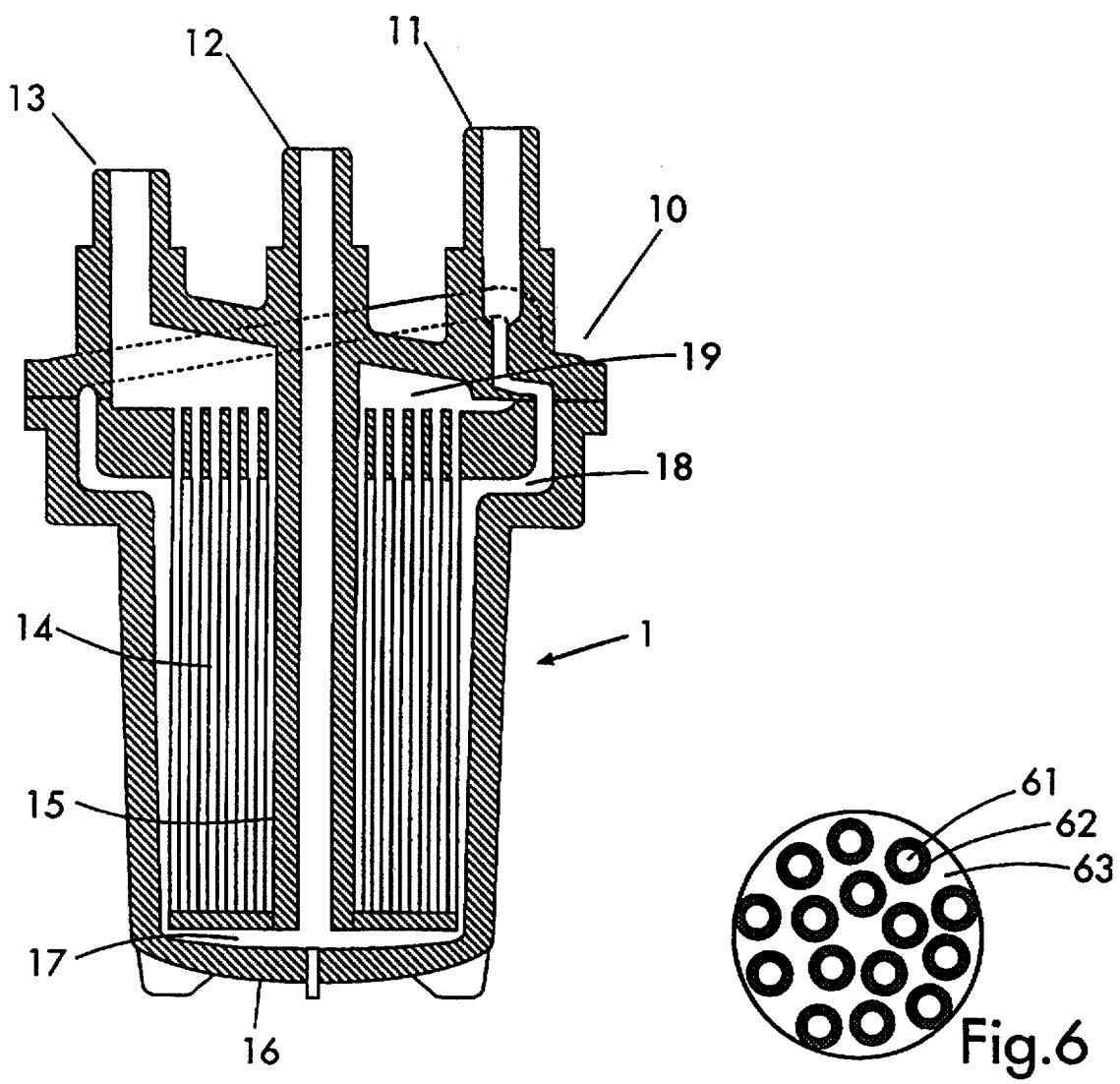
FIG. 1a shows a cross-sectional side view of a dead-ended membrane filtration module according to this invention with all ports on the top end and which includes a single-ended hollow fiber as the membrane separation element in which the liquid permeates from the outside to the inside of the hollow fiber.

The present invention, as more fully described below, is useful for membrane modules used to filter liquids run in both dead-ended and tangential flow filtration (TFF) mode. A dead-ended membrane filter has two streams, feed and permeate (or filtrate), and therefore, requires a minimum of two ports for connecting the module to the remainder of the fluid processing system. Typically, a third port is used to provide venting to the feed side of the module when the fluid is a liquid, otherwise, air introduced into the feed stream becomes trapped upstream of the membrane thereby obstructing liquid flow. All of the flow introduced into the feed port is collected at the permeate port. In contrast, a TFF filter has three streams, feed, permeate and retentate, and therefore, requires a minimum of three ports. In a TFF filter only a fraction of the feed flow is filtered, the balance being collected on the opposite end of the flow passages upstream of membrane at the retentate port. Sometimes an additional port is provided to drain the module; however, such ports are typically inactive during operation. Given that the preferred orientation of the active ports in the present invention is on the top of the module, a drain port is often located on the bottom end opposite to the other ports. These drain ports do not normally interfere with the ease of connection of the module. All of these types of filters, with or without drain ports, can be used with the present invention.

Membrane filters are distinguished from other non-membrane filters by the fact that membranes have a narrower pore size distribution, can be made with very small pores, and their structure is monolithic, i.e. the solid structure is permanently bonded forming a continuous solid phase. In contrast, non-membrane filters are formed by fibers held in place by mechanical entanglement or other surface forces. Depending on the pore size range, membranes are classified into one of three categories: microporous or MF membranes, with pores approximately in the range 0.02–10 µm; ultrafiltration or UF membranes with pores small enough to retain macromolecules (molecular weight of about 1,000 to 10,000,000 daltons); nanofiltration (NF) or reverse osmosis (RO) membranes with pores capable of retaining small molecules and even ions (molecular weight of about 10 to 1,000 daltons). Membranes are made from various materials, including polymers, metals, ceramics, glass and carbon. All of these types of membranes can be used with the present invention.

Membranes have also been used as support structures for adsorptive resins as disclosed by Yen et al. in U.S. patent application Ser. No. 08/467,259 whose disclosure is hereby incorporated by reference. These type of membranes find application in adsorptive purification processes or as a combined filter and purifier. Additionally, membranes have also been made with surfaces that have been chemically modified by the attachment of chemical moieties to act as adsorptive media. An example is disclosed by Steuck et al. in U.S. Pat. No. 4,618,533 whose disclosure is hereby incorporated by reference. Both of these types of membranes can also be used with the present invention.

Figures 4A, 5:
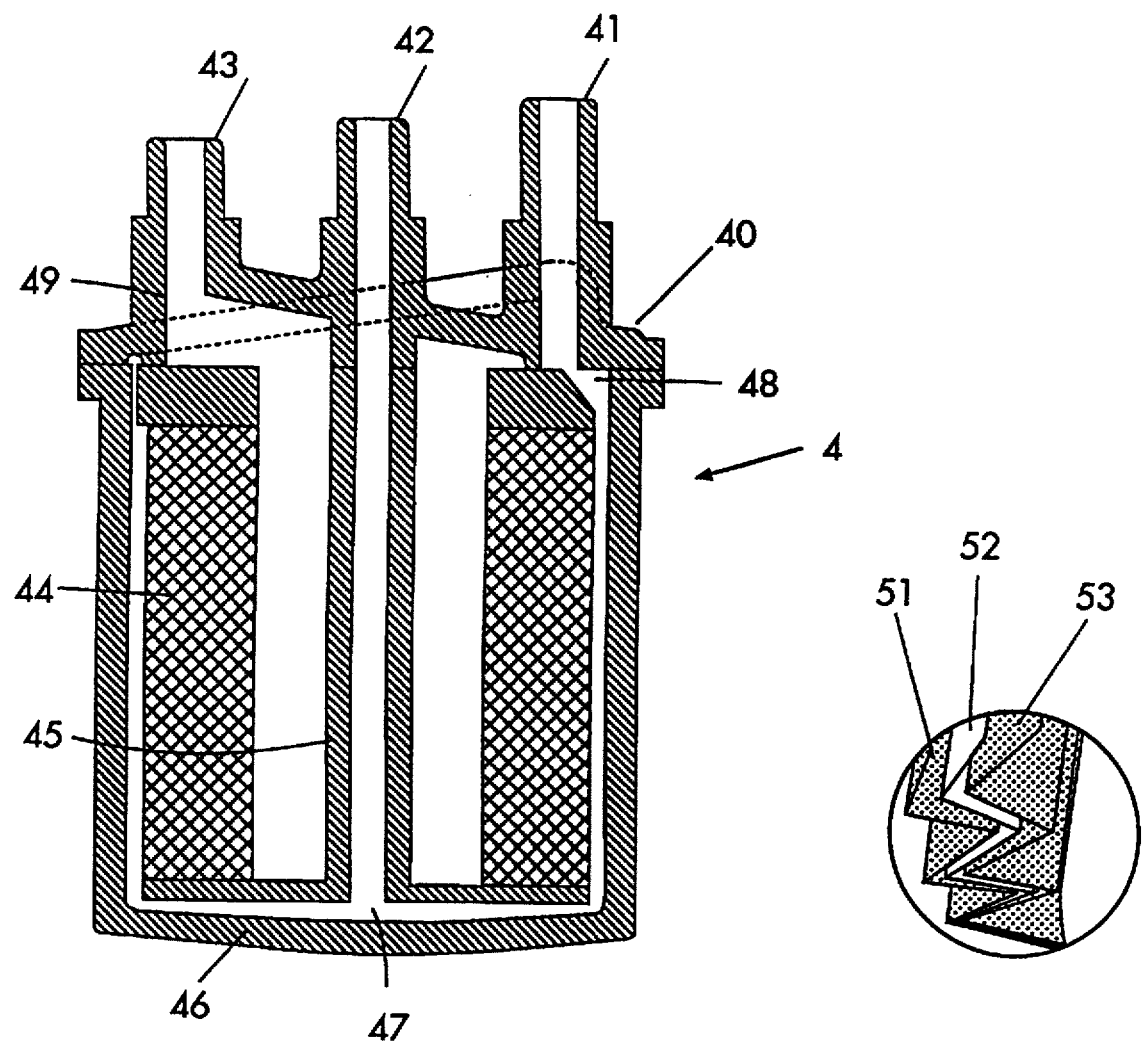
FIG. 4a shows a cross-sectional side view of a dead-ended membrane filtration module similar to the embodiment shown in FIG. 1a except that a pleated membrane is used as the separation element.
FIG. 5 shows an expanded cross-sectional view of the pleated membrane separation element of FIG. 4a indicating the presence of flow passages, formed by a spacer, upstream and downstream of the membrane.

Membrane separation elements consist of a membrane filter and flow passages upstream and downstream of the membrane. The membrane filter can either be in the form of a flat sheet or a hollow fiber. Separation elements made with flat sheet membranes require the use of spacers to provide support to the membrane and to create a series of flow passages for introducing and collecting the fluid to and from the membrane. FIG. 5 shows a cross-sectional view of a flat-sheet separation element in a pleated configuration consisting of feed passages 51 upstream of a membrane 52, and permeate passages 53 downstream of the membrane. In contrast, hollow fiber membranes are self-supporting and therefore do not require spacers. FIG. 6 shows a cross-sectional view of a hollow fiber separation element disposed for the permeate to be collected on the lumen of the hollow fiber. Accordingly, feed passages 63 are formed by the space between hollow fiber membranes 62, while permeate passages 61 are formed by the lumen of the hollow fiber. To seal the hollow fibers and thereby separate the volume upstream of the membrane from that downstream, the hollow fibers have to be potted into a hollow fiber bundle, which can be done in one of two ways. In one way, both ends of the fiber are potted, thereby allowing the lumen volume to communicate with both ends of the bundle; these are called double-ended hollow fiber bundles. Alternatively, a first end of the fiber can be potted while sealing the second end, thereby allowing the lumen volume to communicate only with the first end of the bundle; these are called single-ended hollow fiber bundles. Which type of hollow fiber separation element is used depends on the specific requirements of the application. In all cases, the objective of the flow passages is to allow the fluid to be efficiently introduced into the separation element for further processing by the membrane and subsequently collected. In this manner, the flow passages permit the inclusion of large amounts of membrane area with minimum obstruction to flow and also assist in providing enhanced flux through the membrane. The flow passages are passive, i.e. they do not change the nature or composition of the fluid and provide substantially unobstructed flow. All of these types of membrane separation elements, utilizing different membrane configurations, can also be used with the present invention.

Turning now in more detail to the preferred embodiments of the present invention, FIG. 1a shows a cross-sectional side view of one embodiment particularly suited for the point-of-use filtration of liquids used in semiconductor fabrication such as photochemicals. In this case, the filter is used in dead-ended mode, and the membrane configuration is that of a hollow fiber. A filter module 1 includes end cap 10 with vent, feed and permeate ports 11, 12 and 13 respectively, a membrane element 14 in the form of ultra-high-molecular-weight polyethylene hollow fibers, a central conduit 15, and housing 16. Liquid to be filtered is introduced into feed port 12 which is connected to central conduit 15 which directs all of the flow to feed chamber 17 at the bottom end of the module. From this chamber the fluid is distributed across the cross-section of the module and reverses direction flowing up and around membrane element 14. The feed liquid is subsequently filtered through membrane element 14, and is collected in permeate chamber 19 from which it exits through permeate port 13. In this embodiment the module includes a disposable housing 16 which is fusion bonded to end cap 10, and the membrane element uses a single-ended hollow fiber bundle in which liquid flows from the outside to the inside (or lumen) of the hollow fiber membranes. Venting of gases introduced in the feed stream is accomplished by first collecting the gas bubbles in chamber 18, followed by venting the gas through port 11.

Figure 1B:
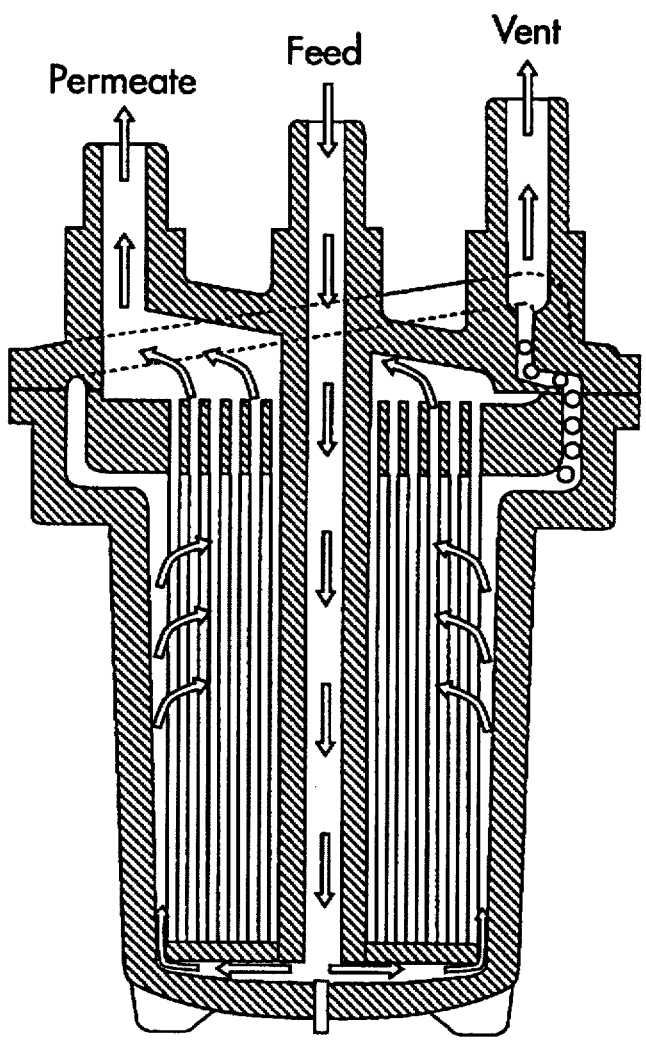
FIG. 1b shows a cross-sectional side view of the module of FIG. 1a illustrating the flow pattern.

The arrows on FIG. 1b show the flow pattern within the module 1, clearly indicating the elimination of the dead space typically present between the membrane element 14 and the housing 16 by the combined action of the central conduit 15 and feed chamber 17. Feed chamber 17 also provides for the uniform distribution of the fluid along the cross-section of the housing.

Figure 2A:
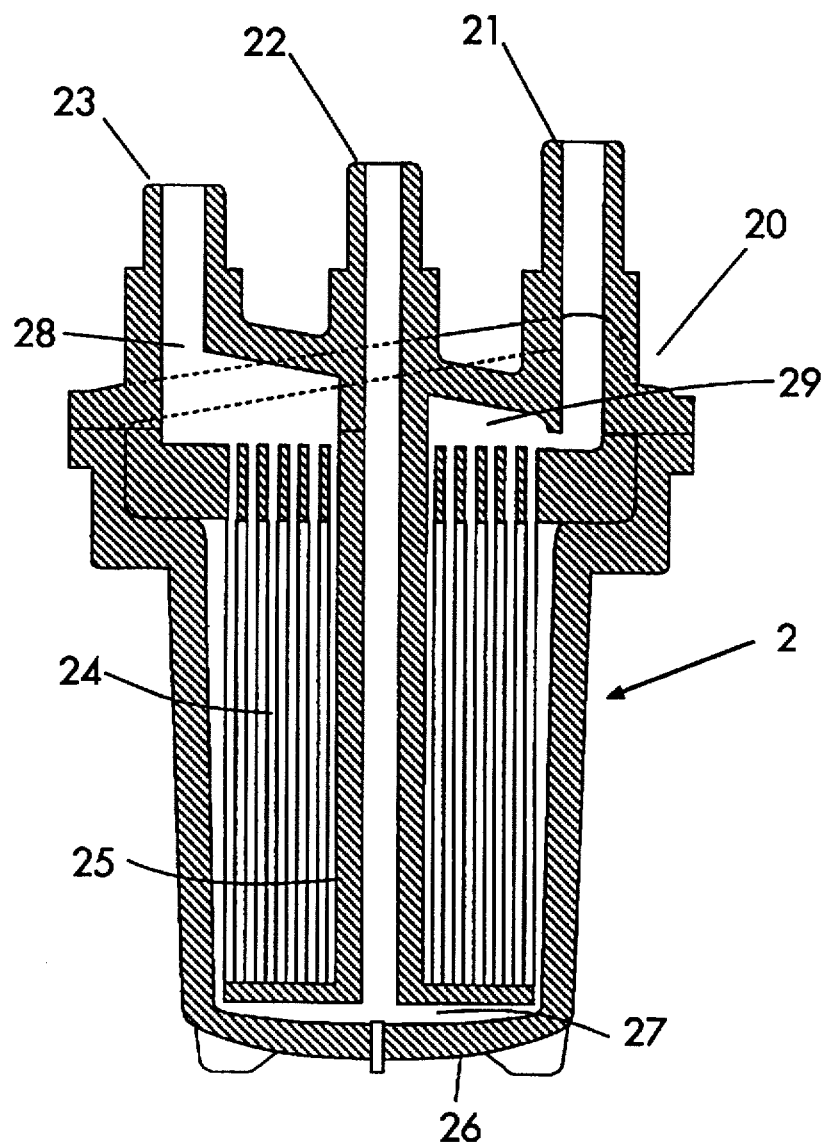
FIG. 2a shows a cross-sectional side view of a dead-ended membrane filtration module according to this invention with all ports on the top end which includes a single-ended hollow fiber as the membrane separation element in which the liquid permeates from the inside to the outside of the hollow fiber.
Figure 2B:
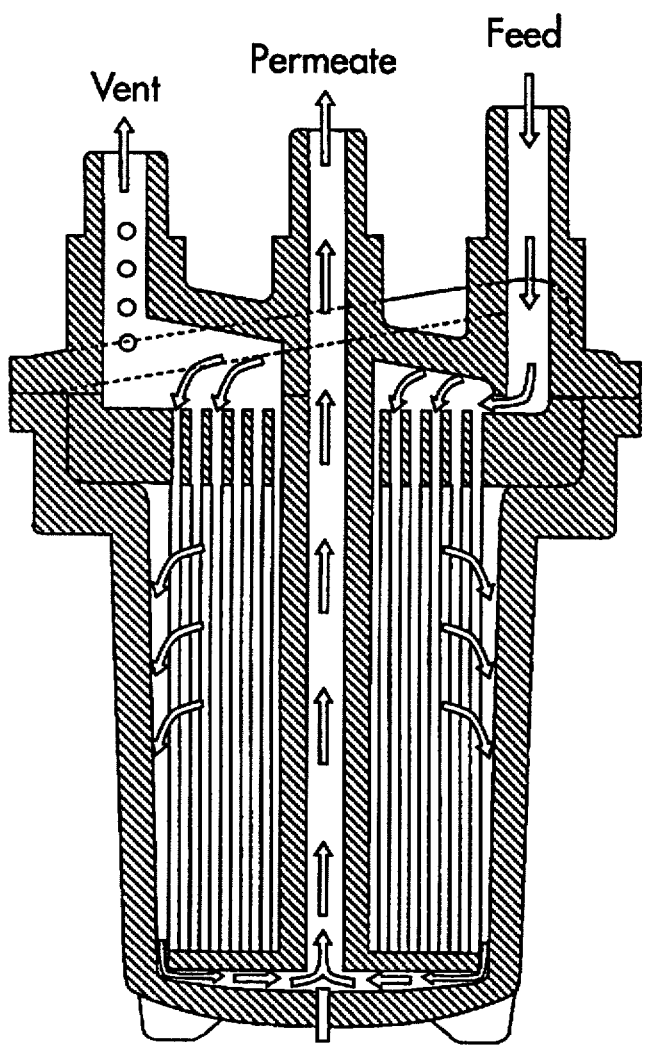
FIG. 2b shows a cross-sectional side view of the module of FIG. 2a illustrating the flow pattern.

In the embodiment described above, the central conduit 15 is used to redirect the feed liquid and distribute it to the opposite end of the module 1. In contrast, the central conduit may be alternatively used to collect the permeate stream from one end and redirect it to the opposite end. FIG. 2a shows an example of this embodiment, which is similar to the one described in FIGS. 1a and 1b, except that the function of the ports has been changed, the vent port being accordingly in fluid communication with the feed port. All ports are located on end cap 20. Liquid to be filtered enters the module 2 through feed port 21, with venting provided by vent port 23. The liquid enters the lumen of the hollow fiber membrane separation element 24, is filtered, and subsequently collected in permeate chamber 27. From there, the fluid is redirected by central conduit 25 to permeate port 22. The arrows on FIG. 2b show the flow pattern within the module, clearly indicating the elimination of the dead space typically present between the membrane element 24 and housing 26 by the combined action of the central conduit 25 and permeate chamber 27. Permeate chamber 27 also provides for the uniform collection of the fluid along the cross-section of the housing. Venting of gases introduced in the feed stream is accomplished by first collecting the gas bubbles in chamber 28, followed by venting the gas through port 23.

Figure 3A:
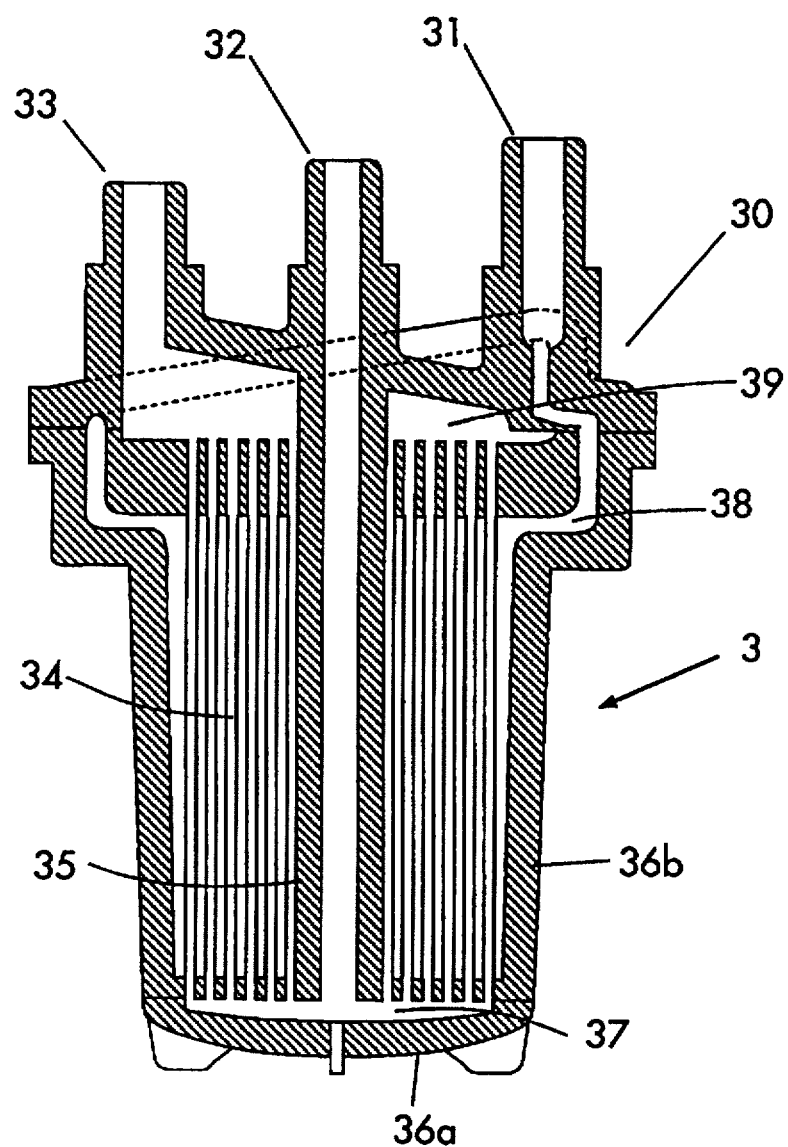
FIG. 3a shows a cross-sectional side view of a tangential flow membrane filter according to this invention with all ports on the top end which includes a double-ended hollow fiber element in which the liquid permeates from the inside to the outside of the hollow fiber.
Figure 3B:
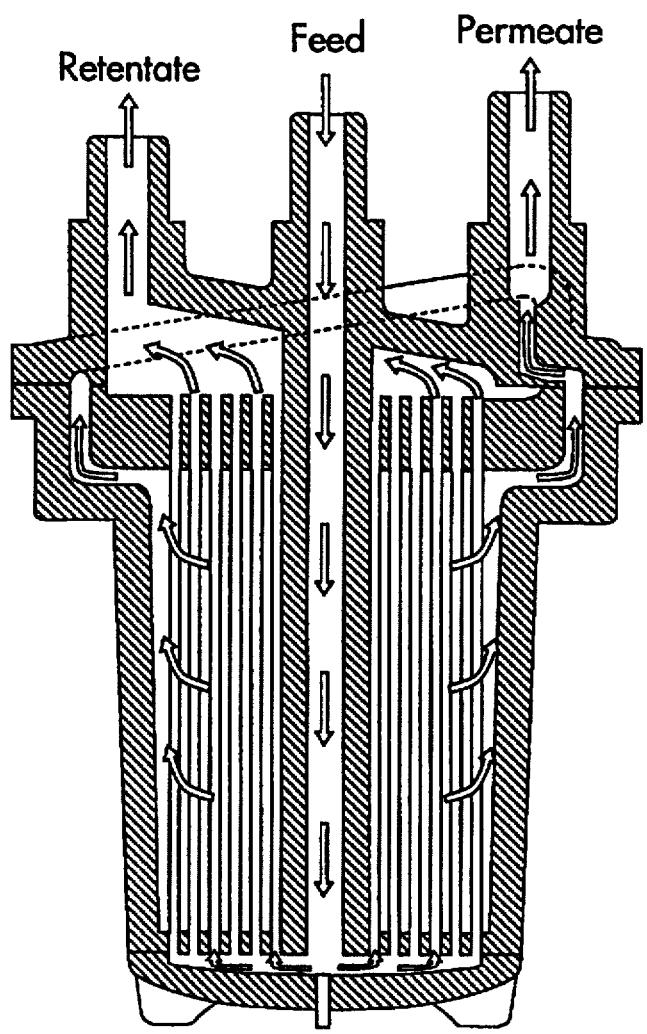
FIG. 3b shows a cross-sectional side view of the module of FIG. 3a illustrating the flow pattern.
Figure 3C:
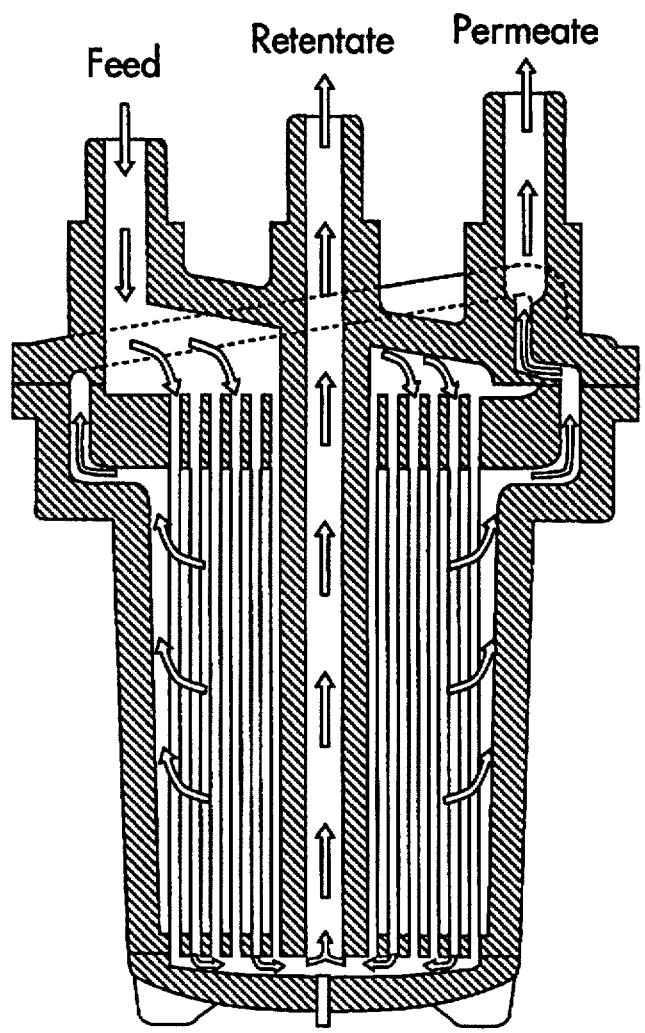
FIG. 3c shows a cross-sectional side view of the module of FIG. 3a illustrating the flow pattern for the case in which the feed and retentate ports are reversed.

FIGS. 3a and 3b show an alternative embodiment of a hollow fiber membrane disposable module used in TFF mode, and particularly suited for water purification. In this embodiment, the separation element is a UF polysulfone hollow fiber membrane element 34 formed as a double-ended bundle, with liquid permeation through the membrane occurring from the inside to the outside of the hollow fiber. Liquid to be filtered enters the module 3 through center port 32 which is connected to central conduit 35 which directs the flow of feed liquid to the bottom end of the module to feed chamber 37. From there the liquid reverses direction flowing upwardly and into the inside of the hollow fibers, from which it is partially filtered through the walls of the hollow fibers. The permeate is collected in chamber 38 (the "shell side" of the hollow fiber bundle) from which it exits through port 31. The retentate stream flows upwardly within the hollow fiber lumen, and is collected at the top end of the hollow fiber bundle in retentate chamber 39 which subsequently exits port 33. In this embodiment, the module is made of three pieces i.e., top end cap 30, bottom end cap 36a and cylindrical shell 36b, all of which are fusion bonded. The arrows on FIG. 3b show the flow pattern within the module, clearly showing how chamber 37 provides for the uniform distribution of the liquid along the cross-section of the housing thereby providing for a TFF module that has all of the active connections on only one end. This capability, uniquely provided by this invention, makes the design of TFF systems much simpler and installation of TFF modules much easier without compromising in any way the performance of the TFF module. In another example, FIG. 3c shows the same embodiment, but with the feed and retentate ports reversed.

Figure 4B:
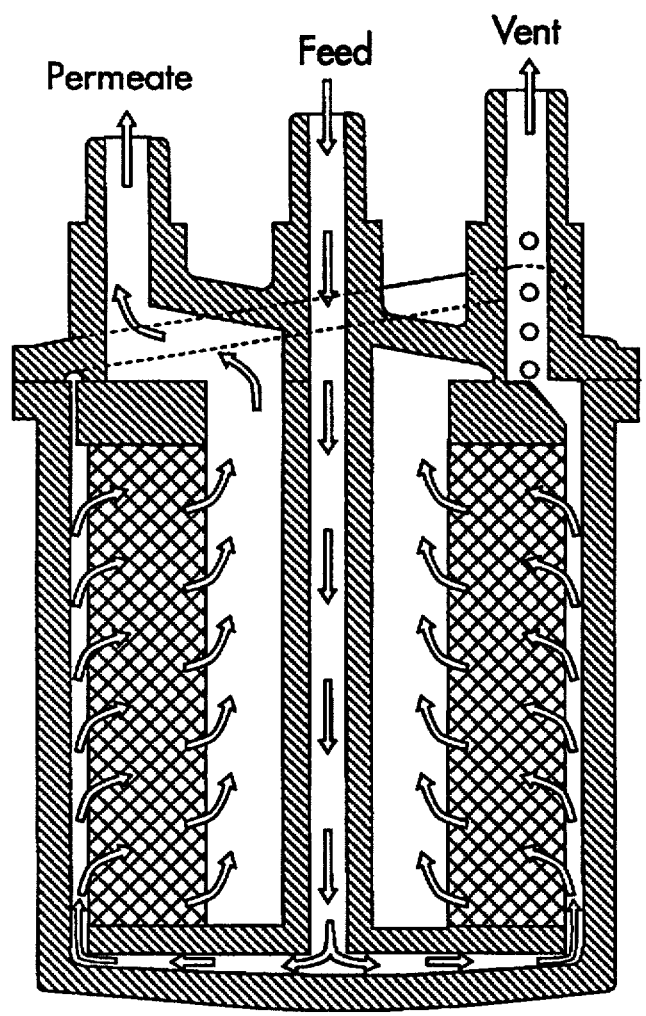
FIG. 4b shows a cross-sectional side view of the module of FIG. 4a illustrating the flow pattern.

FIGS. 4a and 4b show side views of still another embodiment of this invention. In this particular embodiment, a disposable module 4 run in dead-ended mode consists of a housing 46 which is fusion bonded to end cap 40, and uses a pleated membrane element 44 surrounding the central conduit 45. The module consists of end cap 40 with vent, feed and permeate connections 41, 42 and 43 respectively, a membrane element 44 in the form of an ultra-high-molecular-weight polyethylene flat sheet membrane that has been pleated, and which surrounds central conduit 45, and housing 46. Liquid to be filtered is introduced into feed port 42 which is connected into central conduit 45 which directs all of the flow to feed chamber 47 at the bottom end of the module. From here the liquid is distributed across the cross-section of the module and reverses direction flowing up and around membrane element 44. The feed liquid is subsequently filtered through membrane element 44, collected in permeate chamber 49 from which it exits through permeate port 43. The arrows on FIG. 4b show the flow pattern within the module, clearly indicating the elimination of the dead space typically present between the membrane element and the housing by the combined action of the central conduit and feed chamber 47. Feed chamber 47 also provides for the uniform distribution of the liquid along the cross-section of the housing 46. Venting of gases introduced in the feed stream is accomplished by first collecting the gas bubbles in chamber 48, followed by venting the gas through port 41.

All of the foregoing examples exhibit the importance of providing as part of a membrane filter module a central conduit which directs all of the liquid flow from one end of the module to the opposite end. In this manner, even though the liquid is introduced and collected on one end of the module it flows within the module as if it was introduced at one end and collected at the other end, thereby effecting a very favorable flow pattern which eliminates the presence of dead spaces and provides uniform distribution or collection of the liquid.

While the examples illustrate the versatility of the present invention, as well as its essential features, it should be understood that there are numerous variations that from time to time may be preferable to those presented here. Examples of variations also intended to be covered by this invention are: UF and RO membranes; spiral wound and disc filter elements; membranes made of any number of other polymers, such as polytetrafluoroethylene, polycarbonate, polypropylene, polyethersulfone and polyvinyidene fluoride as well as stainless steel and ceramic membranes; membranes with active adsorbents trapped within the structure of the membrane or attached to the membrane surfaces (e.g. ion exchange resins, activated carbon, ligands for specific solutes); epoxy sealed filter elements; connecting ports at right angles to the body of the housing, as well as connecting ports which may not be parallel to each other. Finally, it should be recognized that even though reference has been made to the needs of the semiconductor industry, and even to some specific applications within that industry, other industries have similar requirements, as for example the nuclear, biological, biotech and pharmaceutical industries, in which safety, containment and ease of filter replacement are also critical.

We claim:

1. A fluid separation module having first and second ends and being free of a dead volume comprising:

a housing having;

a separation element contained within said housing to divide the interior of said housing into first and second volumes, said separation element comprising a microporous or ultrafiltration membrane and a series of flow passages upstream and downstream of said membrane;

an end cap bonded to said housing; first and second active connector means for a fluid feed and for a permeate located at said first end for introducing fluid feed into the interior of said housing and for removing permeate from the interior of said housing;

said second end being free of an active connector means;

said first end being free of an active retentate connector means;

a central conduit attached to said first connector means and extending longitudinally within said housing to said second end so as to direct all of the flow between said first connector and said second end;

said second end being in fluid communication with said first volume;

said second volume being in fluid communication with said second connector means;

whereby a fluid fed introduced into one of said connector means is processed by said separation element to form a permeate collected at the other of said connector means.

2. The module of claim 1 including a gas vent means located at said first end and being in fluid communication with said first volume or said second volume.

3. The module of claims 1 or 2 wherein said membrane is in the form of a hollow fiber membrane.

4. The module of claim 3 wherein said membrane is formed from ultrahigh molecular weight polyethylene.

5. The module of claim 3 wherein said membrane is formed from polyethersulfone or polysulfone.

6. The module of claims 1 or 2 wherein said membrane is in the form of a flat sheet membrane.

7. The module of claim 6 wherein said flat sheet membrane is a pleated cartridge filter surrounding said central conduit.

8. The module of any one of claims 1 or 7 wherein said membrane is formed from ultrahigh molecular weight polyethylene.

9. The module of claim 6 wherein said membrane is formed from ultrahigh molecular weight polyethylene.

10. The module of claim 6 wherein said membrane is formed from polyethersulfone or polysulfone.

11. The module of claims 1 or 2 wherein each of said series of flow passages are substantially unobstructed.

12. The module of claims 1 or 2 including a chamber at said second end for collecting said fluid and distributing it within said housing toward said first end.

13. The module of claim 1 wherein said membrane is formed from polyethersulfone or polysulfone.

14. The module of claim 1 wherein said membrane includes means for adsorbing certain constituents contained in said fluid.

15. The module of claim 14 wherein said membrane has embedded therein resin particles.

16. The module of claim 14 wherein said membrane is surface modified with chemical moieties.

17. A method for filtering a liquid within a fluid separation module free of a dead volume comprising a housing fused to an end cap and a separation element contained within said housing which comprises:

introducing a liquid to be filtered into one of a first connector or a second connector located at a first end of said housing for introducing liquid into the interior or said housing and removing liquid from the interior of said housing through the other of said first connector of said second connector;

said separation element dividing the interior of said housing into first and second volumes;

said separation element comprising a microporous or ultrafiltration membrane and a series of flow passages upstream and downstream of said membrane;

a central conduit attached to said first connector and extending longitudinally when said housing to said second end so as to direct all of the liquid flow between said first connector and said second connector;

said second end being in fluid communication with said first volume;

said second volume being in fluid communication with said second connector, whereby a liquid feed introduced into one of said connectors is processed by said separation element to form a permeate collected at the other of said connectors.

18. The method of claim 17 wherein said liquid feed is passed through said first connector and said permeate is passed through said second connector.

19. The method of claim 17 wherein said liquid feed is passed through said second connector and said permeate is passed through said first connector.

* * * * *